May 7, 1929.  J. D. WILLIAMS  1,711,915
AUXILIARY SCRAP SHEARS
Filed April 2, 1927  2 Sheets-Sheet 1

WITNESS
F. J. Hartman.

INVENTOR
John D. Williams.
BY Blount & Hilbert
ATTORNEYS

May 7, 1929.  J. D. WILLIAMS  1,711,915
AUXILIARY SCRAP SHEARS
Filed April 2, 1927  2 Sheets-Sheet 2

INVENTOR
John D. Williams.
BY Blount & Helbik
ATTORNEYS

WITNESS
F. J. Hartman.

Patented May 7, 1929.

1,711,915

UNITED STATES PATENT OFFICE.

JOHN D. WILLIAMS, OF NILES, OHIO.

AUXILIARY SCRAP SHEARS.

Application filed April 2, 1927. Serial No. 180,371.

In the manufacture of plates and sheets it is customary to square up their edges by trimming with a suitable shear. This results in one or more narrow strips of scrap of irregular width being severed from each plate, the length of the strips being of course determined by the width of the latter; as they are severed consecutively from the plates the strips collect on the rear side of the shear from which position they are removed from time to time and bundled together for scrap. However, when the plates are of relatively great width, as, for example, 120 inches, the strips are too long to be formed into bundles of convenient size and it has therefore been the custom to carry the strips from the plate shear to a smaller shear or other apparatus and there cut them into suitable lengths, say three feet or thereabouts, before forming them into bundles. This operation entails a considerable amount of labor and time and requires the provision of a separate shear for its accomplishment.

A principal object of the present invention is to provide in combination with a plate or other shear an auxiliary shear or shears operative to cut the strips of scrap after they are severed by the former into lengths suitable for bundling, thus avoiding the necessity of carrying the strips to a separate shear for this purpose and permitting the scrap to be transported directly from the plate shear to the bundling machine or the like.

A further object of the invention is the provision, in operative association and combination with a plate shear of ordinary construction, of auxiliary scrap shear mechanism operated entirely through the power supplied for the operation of the plate shear and which is entirely automatic in action, of rugged and simple construction and not liable to get out of order under the conditions of operation to which mechanism of this general character is necessarily subjected.

A still further object of the invention is to provide an auxiliary scrap shear mechanism which may be readily attached to shears of the character now in general use for trimming and shearing plates and the like and which requires no attention by the operator of the plate shear but functions entirely automatically and in timed relation and correspondence with the movements of the movable knife or shear blade of the plate shear.

Figure 1:
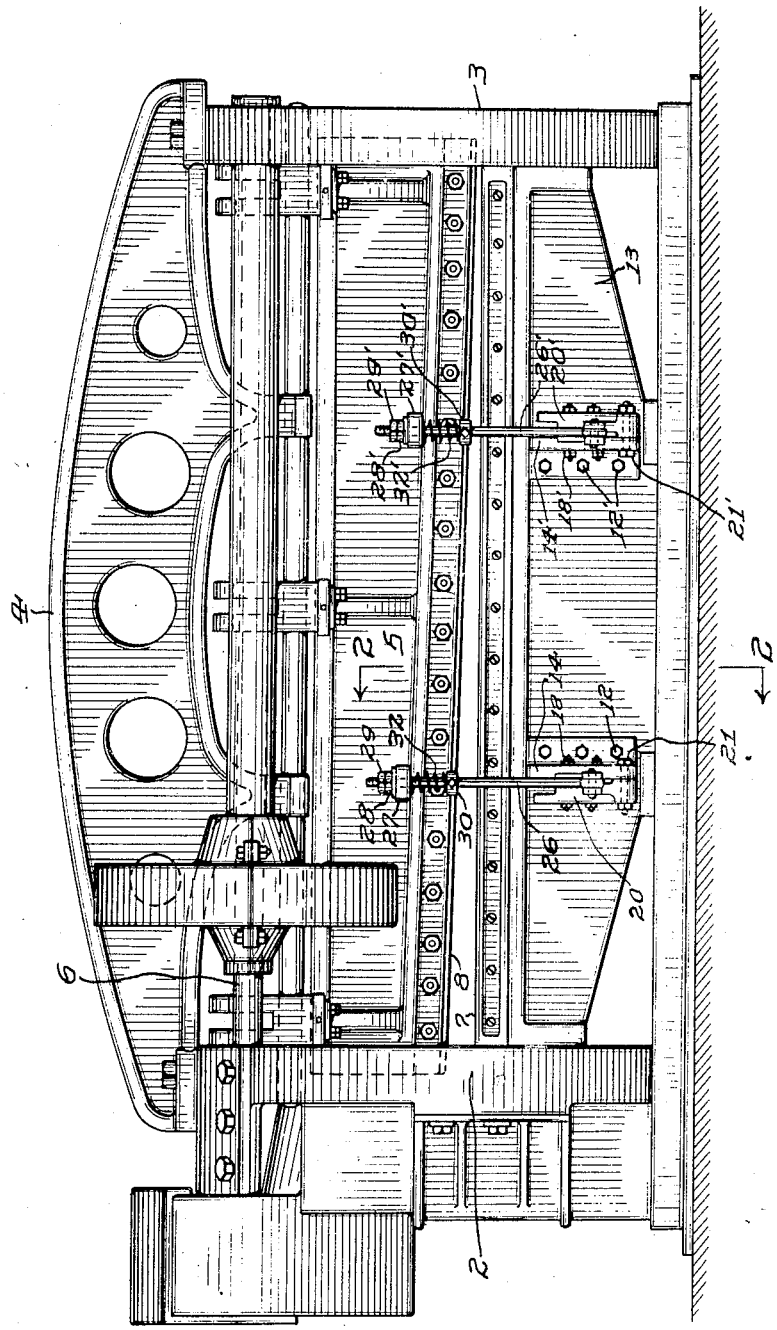
Figure 2:
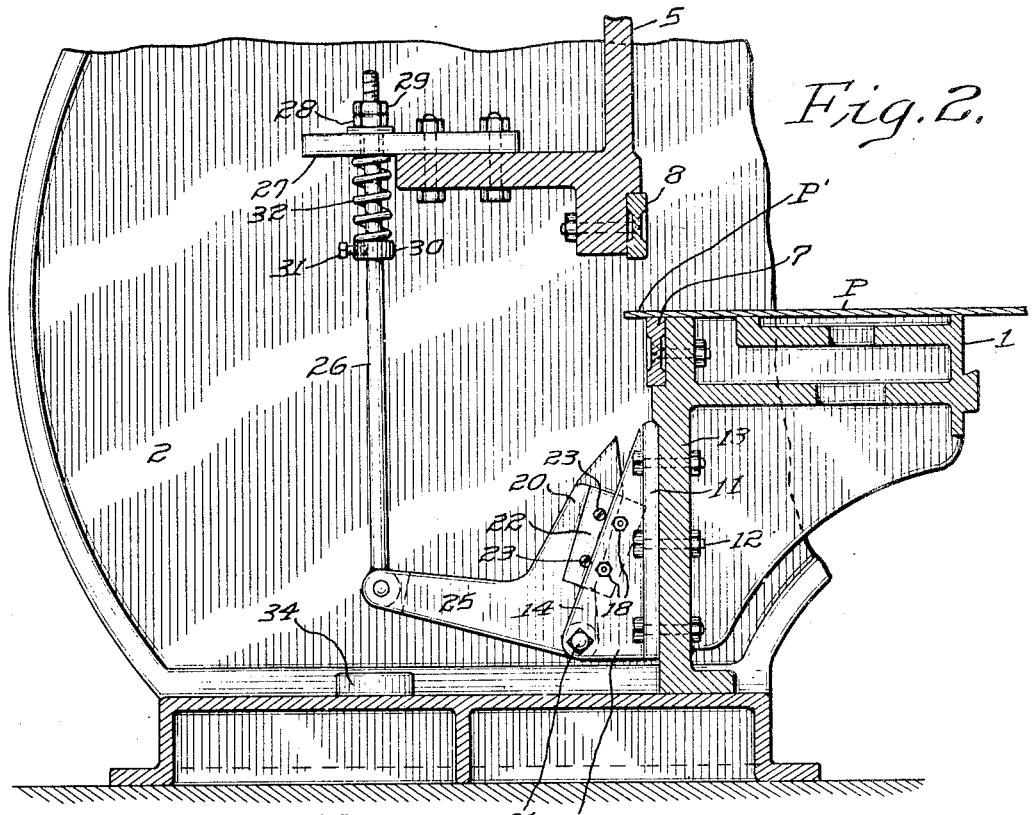
Figures 3, 4:
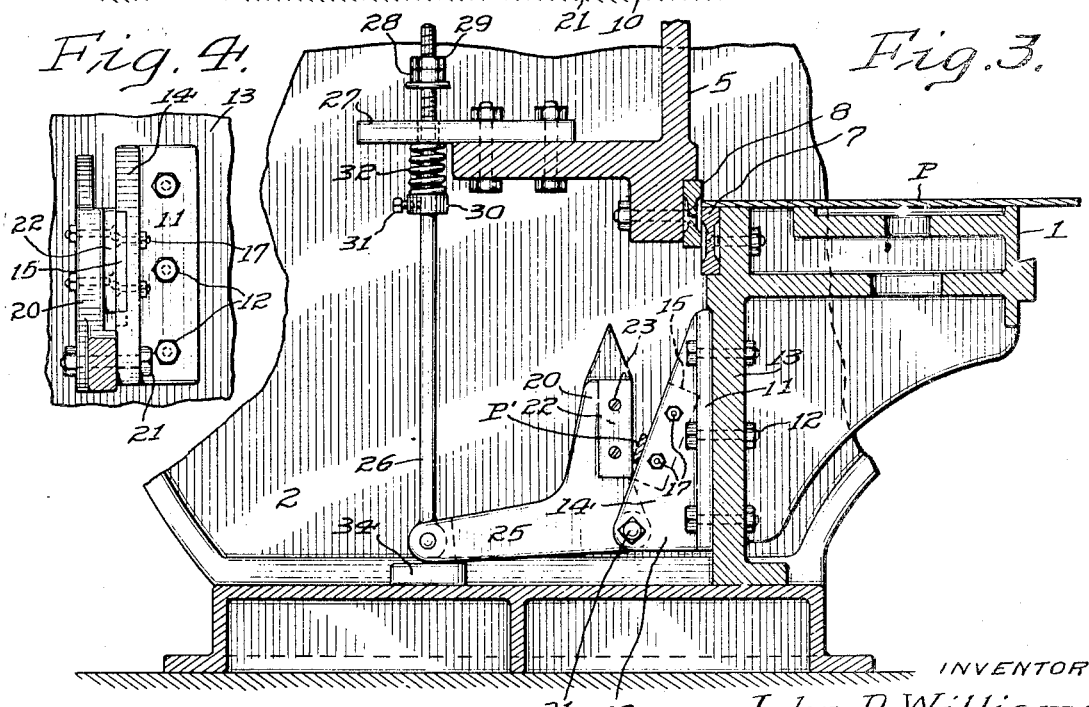

My invention further includes other objects, advantages and novel features of design, construction and arrangement to which reference is hereinafter more particularly made or which will be apparent from the following description of one embodiment of the invention as illustrated in the accompanying drawings in which Fig. 1 is a rear elevation of a plate shear of ordinary construction having operatively combined and associated therewith auxiliary shear mechanism in accordance with my invention; Figs. 2 and 3 are respectively fragmentary enlarged transverse vertical sections on line 2—2 in Fig. 1 looking in the direction of the arrows and showing portions of the plate shear and auxiliary shear mechanism in different positions, and Fig. 4 is a fragmentary detail rear view of the jaws of said mechanism.

As the plate shear with which the auxiliary shear mechanism is combined may be of any usual or preferred construction I have illustrated and shall only refer to so much of the same as is necessary for an adequate comprehension of the present invention. Thus, and as best shown in Fig. 1, the plate shear may comprise a table 1 disposed between laterally spaced housings 2, 3 whose upper ends are connected by a heavy yoke member 4. Between the housings is arranged a slide 5 vertically movable in ways formed in the housings and actuated through suitable mechanism interposed between it and power shaft 6 to which power is supplied in any suitable way. The lower or stationary shear blade or knife 7 is removably secured in horizontal transversely extending position adjacent the rear edge of the table and a complementary upper or movable shear blade or knife 8 is similarly secured adjacent the lower edge of the slide which is preferably angularly upwardly inclined from one end to the other so that as the slide descends from the position shown in Fig. 2 and carries the upper blade over the adjacent face of the lower one, the overhanging edge P' of a plate P disposed on the table will be progressively sheared off from one lateral edge of the plate to the other. As shears of this general character are in common use and well understood by those familiar with the art further description would be superfluous.

As the strip P' is progressively severed from the plate it would normally fall to the ground or floor in the rear of the shear and, in due course, as already described, be removed therefrom, carried to a separate scrap shear and there cut into two or three sections of convenient length. In accordance with my invention, however, the main or plate shear is equipped with one or more of the auxiliary shear mechanisms now to be described and which are effective to receive the strip P' after it is severed from the plate and, in turn, to sever the strip transversely as the slide of the plate shear ascends during the latter half of its cycle of operations, thereby cutting the strip into two or more pieces which fall to the ground or other point behind the plate shear in a position convenient for direct removal to the scrap bundling machine.

In the particular embodiment of the invention which I have chosen to illustrate, the plate shear is equipped with two of the auxiliary shear mechanisms but it will be understood that a greater or lesser number may be used if desired in accordance with the width of the plate shear and the lengths into which it is desired to cut the strips of scrap, it being apparent that when two of the said mechanisms are used and respectively disposed, as shown, substantially at equal intervals from the ends of the plate shear blades and from each other that a strip of scrap cut from a plate whose width approximates the capacity of the plate shear will be severed by the auxiliary shear mechanisms into three pieces of substantially equal length, whereas if but a single one of said mechanisms is employed and positioned substantially centrally of the blades the strip of scrap under like conditions will be cut into but two pieces. Furthermore as each of said mechanisms is substantially similar to the others except that when two of them are used they may, as best shown in Fig. 1, be conveniently made in rights and lefts in so far as certain parts are concerned, the following description, which is directed more particularly to the shear mechanism disposed to the left of the center line of the plate shear when viewed from the rear is equally applicable to that mechanism which is disposed on the right hand side of such center line and to the elements of which the same numbers are applied but with the addition of a prime (').

More particularly, each auxiliary shear mechanism may comprise a stationary jaw, generally designated as 10, and having a base flange 11 adapted to be secured, as by bolts 12, to the rear face of the apron 13 which depends below and serves to support the shear blade 7 or to any other suitable portion of the plate shear. The jaw is also provided with a rearwardly directed flange 14 the outer edge of which is inclined downwardly and rearwardly from the top of the jaw to the lower end thereof, desirably at an angle of about 20° to the vertical, although the particular slope of this edge of the jaw may be varied considerably. The flange 14 is operative to support a shear blade 15 and as it is preferable to have this blade readily removable for resharpening or replacement that face of the flange 14 which is remote from the base flange 11 may be desirably recessed for the reception of the blade, which may be rectangular in shape, so that the blade when positioned in the recess will lie flush or substantially flush with the face of the flange in which position it may be secured by bolts 17 having their heads countersunk in the outer face of the blade and extending therethrough and through the flange and provided with nuts 18 behind the latter.

Cooperative with the stationary jaw 10 is a movable jaw generally designated as 20 and pivoted for movement in a vertical plane adjacent the lower end of the flange 14 by a pivot bolt 21 extending transversely through the parts. To the movable jaw, similarly to the stationary one, is attached a shear blade 22 desirably substantially similar to blade 15 and removably secured in position by bolts 23 having their heads countersunk in the outer face of the blade and extending through it and through the jaw, the arrangement being such that as the jaw is moved forwardly about its pivot, the blades 22 and 15 will cooperate to exert a shearing action. The upper end of the movable jaw above the blade may be inclined rearwardly away from the stationary blade so as to progressively increase the distance between the jaws above the blades, while the shape of the movable jaw in the vicinity of its blade and the arrangement of the latter thereon is preferably such that when the movable jaw is in fully open position as hereinafter described the cutting edge of the blade 22 will extend substantially vertically so that a V-shaped opening is formed between the proximate edges of the stationary and movable jaws into which the strip P' will descend as it is severed from the plate.

The movable jaw is also provided with an arm 25 preferably integral with the main portion of the jaw and extending generally rearwardly substantially at right angles thereto to which, adjacent its rearmost extremity, is pivotally connected an upwardly extending rod 26 which passes loosely through a block or plate 27 suitably secured to the slide 5 of the plate shear. The upper end of the rod above the block may be threaded for the reception of a nut 28 and lock nut 29 which are thus adjustable on the rod, while below the block the rod is provided with a collar 30 which can be maintained in any desired position of adjustment on the rod by a set screw 31 or other convenient means and is adapted to form a seat for the lower end of a relatively strong coil spring 32 loosely surrounding the rod beneath the block. If desired a block 34 of wood or other suitable material may be arranged beneath the outer end of the arm 25 to limit its downward movement and prevent it from striking the base of the shear.

Brief reference will now be made to the operation of the various mechanisms heretofore described: When the slide 5 carrying the movable blade of the plate shear is raised to permit the leading edge of the plate P which is to be trimmed to be pushed between the blades 7 and 8 so as to overhang the former as shown in Fig. 2, the block 27, through contact with the nut 28 as the block has moved upward during the completion of the preceding cycle of operations of the plate shear, has lifted the rod 26 thereby swinging the movable jaw 20 about its pivot so as to bring the blades 22 and 15 together and also, by increasing the distance between block 27 and collar 30, allowing spring 32 to expand. After the plate P is pushed to the desired position, the slide 5 of the plate shear is caused to descend, thus through cooperation of the blades 7 and 8 progressively shearing off the strip P' from one lateral edge of the plate to the other. Meanwhile, however, during the descent of the slide the spring 32 pushing downward on collar 30 causes nut 28 to follow block 27 and forces rod 26 downward, thereby swinging jaw 20 rearwardly about its pivot until further movement of the jaw is arrested by contact of arm 25 with block 34 or other limiting means. After the opening movement of the jaw is thus arrested any further movement of the slide and block is merely effective to compress spring 32, and since the parts are preferably so arranged and adjusted that the jaws of the auxiliary shear will be fully open before the slide has completed its descent they are thus placed in position to receive the strip P' considerably before it is fully severed from the plate P so that after the severing operation is entirely completed the strip is free to fall between the jaws of the auxiliary shears to substantially the position indicated in Fig. 3. During the ensuing upward movement of the slide 5, the block 27 moves freely upward until it engages the nut 28 after which further upward movement of the slide and block is effective to positively close the movable jaw of the auxiliary shear mechanism, thus cutting the strip transversely and allowing the parts thereof on either side of the mechanism to fall to the ground or other supporting means into a position for convenient removal.

It will thus be apparent that the spring 32 tends to force the jaws of the auxiliary shear open whenever the block 27 is out of engagement with or moving away from the nut 28 so that whenever a strip is being sheared off of a plate by the plate shear the auxiliary shear mechanism is in position to receive the strip, and further, that whenever the slide of the plate shear moves upwardly so as to fully open the jaws thereof the jaws of the auxiliary shear will be closed so as to transversely sever the strip of scrap which has been cut from the plate and has been caught by them as it fell therefrom.

It will be noted from a consideration of the drawings and foregoing description of the arrangement and operation of a machine constructed in accordance with a preferred embodiment of my invention that the auxiliary shear blades are preferably so disposed as to operate in a plane normal to the plane of operation of the blades of the plate shear and in such relation with regard to the latter that the strip when severed from the plate will fall naturally between the jaws of the auxiliary shear preparatory to being acted on by them.

It will be further apparent that the operation of the auxiliary shear mechanism, irrespective of the number of such mechanisms which may be employed, is entirely automatic and further consumes a negligible amount of power while, as the said mechanism is positioned in the rear of the plate shear and substantially beneath the movable slide thereof, it does not consume any floor space additional to that consumed by the plate shear itself which is a matter of material importance where such space is limited.

As I believe myself to be the first to employ in combination with a plate or other shear, auxiliary shear mechanism operated therefrom and in timed relation therewith for receiving and cutting up elongated pieces or strips as cut off by the shear, I consider myself entitled to claim the invention in its broadest aspects and therefore do not desire or intend to restrict myself to the use of any specific form or design of auxiliary shear mechanism nor to the combination thereof with any particular type of shear.

Having thus described my invention, I claim and desire to protect by Letters Patent of the United States:

1. The combination with a shear adapted to sever an elongated strip from a plate or the like, of auxiliary shear mechanism comprising relatively movable cooperative jaws disposed adjacent and below the shear, operated in timed relation therewith and adapted to receive the strip as it falls by its own weight after severance from the plate and to then cut it transversely.

2. The combination with a shear adapted to sever an elongated strip from a plate or the like and having relatively movable cooperative shearing blades, of auxiliary shear mechanism comprising a stationary jaw and a movable jaw disposed adjacent and below said blades in such position that the strip when severed from the plate will fall between said jaws and means connecting the movable jaw with the shear and operative to open and close said jaw at predetermined times in each cycle of operations of the shear.

3. The combination with a shear having a stationary blade and a movable blade and adapted to sever a relatively elongated strip from a plate or the like, of auxiliary shear mechanism comprising a pair of relatively movable jaws disposed in position to receive the strip between them after it is severed by the main shear and means connecting one of said jaws with the main shear and operative during the shearing movement of the movable blade of the shear to move said jaw to open position to receive the strip during the shearing movement of the movable blade of the shear and to move said jaw to closed position to cut the strip during the return movement of said blade.

4. The combination with a shear adapted to sever a relatively elongated strip from a plate or the like and having a stationary blade and a vertically movable slide carrying a blade cooperative therewith, of auxiliary shear mechanism comprising a pair of cooperative relatively movable jaws disposed below said stationary blade in a position to receive between them the strip when severed from the plate and means connecting one of said jaws with said slide and operative to move said jaw to open position during the downward movement of the slide and to move the jaw to closed position during the upward movement of the slide so as to cut the strip transversely.

5. In plate shearing mechanism, the combination of a pair of relatively movable shearing blades adapted when in one position to receive between them a plate or the like which is to be sheared, means for causing said blades to approach each other so as to shear the plate, a pair of cooperative shearing jaws disposed adjacent and below said blades, relatively movable in a plane normal to the plane of relative movement thereof and adapted to receive between them the piece sheared from the plate, and means interconnecting one of the jaws and one of said blades operative to move said jaw from open to closed position in such timed relation with the movement of said blade that said jaws are open to receive the piece sheared from the plate as it is carried downward by its own weight after it is severed from the plate.

6. In plate shearing mechanism, the combination of a pair of relatively movable shearing blades adapted when in one position to receive between them a plate which is to be sheared, means for closing said blades together so as to shear the plate, a pair of cooperative shearing jaws disposed beneath said blades one of said jaws being fixed and the other of said jaws being movable, and means interconnecting said movable jaw with one of said relatively movable blades operative to move said jaw in one direction as said blades are closed on each other and in another direction as said blades are moved relatively away from each other.

7. In shearing mechanism, the combination of a pair of relatively movable shearing blades adapted to shear a relatively elongated strip from a plate or the like, means for actuating one of said blades, a pair of relatively movable shearing jaws, each provided with a shearing blade, disposed beneath and at right angles to said first mentioned blades and adapted to receive between them and then cut transversely the strip severed by the blades, and means interconnecting one of said jaws with the movable blade and operative to open and close the jaw in timed relation with the movements of the blade.

8. The combination with a shear adapted for shearing plates or the like and having a stationary transversely extending blade, a vertically movable slide having a blade cooperative with said first mentioned blade and means for actuating the slide, of auxiliary shearing mechanism comprising a fixed jaw disposed beneath and in rear of said blades and having a downwardly and rearwardly inclined edge, a movable jaw pivotally supported for cooperation with the stationary jaw, and means connecting the movable jaw with the slide of the shear and operative to cause the movable jaw to open outwardly from the fixed jaw while the slide is descending and to close toward the fixed jaw while the slide is moving upwardly.

9. The combination with a shear adapted for shearing plates or the like and having a stationary transversely extending blade, a vertically movable slide having a blade cooperative with said first mentioned blade and means for actuating the slide, of auxiliary shearing mechanism comprising a fixed jaw disposed beneath and in rear of said blades, a movable jaw pivotally supported for cooperation with the fixed jaw and movable in a plane normal to the movement of the slide, and means connecting the movable jaw with the slide and operative to positively close the movable jaw toward the fixed jaw during upward movement of the slide and to move the movable jaw away from the fixed jaw during downward movement of the slide.

10. The combination with a shear having a fixed blade, a vertically movable slide, a blade carried by the slide and cooperative with the fixed blade and means for actuating the slide, of auxiliary shear mechanism disposed beneath and in rear of said blades and comprising a fixed jaw having a rearwardly inclined edge, a movable jaw pivoted to the fixed jaw and cooperative therewith to exert a shearing action on an article disposed between the jaws, a block carried by the slide, a rod loosely extending through the block and pivotally connected with the movable jaw, and means carried by the rod and cooperative with the block to lift the rod and turn the jaw about its pivot during upward movement of the slide.

11. The combination with a shear having a fixed blade, a vertically movable slide, a blade carried by the slide and cooperative with a fixed blade and means for reciprocating the slide, of auxiliary shear mechanism comprising a fixed jaw disposed in rear of and beneath the fixed blade and having a rearwardly inclined edge, a movable jaw pivoted to the fixed jaw and cooperative therewith to exert a shearing action on an article disposed between the jaws, a block carried by the slide, a rod loosely extending through the block and connected to the movable jaw, means carried by the rod above the block and cooperative therewith during upward movement of the slide to lift the rod and positively close the movable jaw on the fixed jaw, a collar carried by the rod beneath the block, and a spring interposed between the collar and the block and operative to exert a thrust on the rod in a direction to move the jaw to open position.

In witness whereof, I have hereunto set my hand this 28 day of March, 1927.

JOHN D. WILLIAMS.